Patented Feb. 8, 1944

2,341,282

UNITED STATES PATENT OFFICE 2,341,282

PURIFICATION OF METHYL METHACRYLATE

Barnard M. Marks, Upper Montclair, N. J., assignor to E. I. du Pont de Nemours & Company, Wilmington, Del., a corporation of Delaware No Drawing. Application November 13, 1940, Serial No. 365,463

4 Claims. (Cl. 260—486)

This invention relates to the purification of crude monomeric methyl methacrylate derived from the thermal depolymerization of polymeric methyl methacrylate and, more particularly, to such a procedure whereby monomeric methyl methacrylate is recovered in a state of high purity and substantially free from color.

In United States Patent 2,030,901 of D. E. Strain there is disclosed a process of recovering monomeric methyl methacrylate from its polymer. This process involves the thermal depolymerization of the polymer by heating it to a temperature substantially above its decomposition point and condensing the resulting vapors. The condensate is crude monomeric methyl methacrylate which was purified by simple fractional distillation. This patented process is of considerable commercial importance because it serves as a means of utilizing scrap polymer produced either in the manufacture of methyl methacrylate resin or in the fabrication of articles from such resin.

It has been found, however, that the crude monomer recovered by the process of the Strain patent is more difficult to purify than the monomer prepared by chemical synthesis. This difficulty is apparently due to the presence in the recovered monomer of impurities which do not occur in the synthesized monomer, but the identity of these impurities has not been established. One of the chief purposes of the fractional distillation in the Strain process is to obtain a purified monomer substantially free from color, such as is required commercially for the manufacture of colorless resin. Unfortunately, the color of the distillate resulting from the fractional distillation of the recovered monomer is usually considerably less satisfactory than that of the distillate from crude synthetic monomer and polymer made from it is correspondingly inferior to that made from the latter.

It has not been found feasible to improve the color of the recovered monomer to any satisfactory extent by treatment with adsorbent carbon or by chemical agents.

An object of the present invention is to provide an effective method of purifying monomeric methyl methacrylate recovered by thermal depolymerization of polymeric methyl methacrylate and, thus, to provide a means whereby scrap polymer may be economically recovered in the form of monomeric methyl methacrylate of high purity and substantially free from color. Other objects will be apparent from the description of the invention given hereinafter.

The above objects are accomplished according to the present invention by distilling under substantially atmospheric pressure with steam the crude monomeric methyl methacrylate obtained by thermal depolymerization of polymeric methyl methacrylate. In more detail, the present invention comprises heating polymeric methyl methacrylate at a temperature above its decomposition point, condensing the vapors resulting from such heating, introducing this condensate simultaneously with live steam into a still, condensing the resulting vapors of monomeric methyl methacrylate and water, and separating the liquid monomeric methyl methacrylate from the water.

The depolymerization of the polymeric methyl methacrylate to yield crude monomeric methyl methacrylate may be carried out by any of the several variations in technique suggested by United States Patent 2,030,901 without departing from the present invention. The subsequent step of the patented process of purifying the crude monomer by ordinary fractional distillation, under vacuum to prevent polymerization, is not effective with this recovered monomer in yielding a refined monomer of high purity and substantially free from color. To illustrate, whereas vacuum distillation of synthesized monomeric methyl methacrylate in a packed column leads readily to the production of a purified monomer which is water white, i. e., of color zero in terms of the American Public Health Association standards, and a batch of 7000 pounds of such synthesized monomer can be so purified in about thirty hours, a similar treatment of crude monomer recovered from polymer by thermal depolymerization yields a distilled monomer of relatively poor color, i. e., 10 or higher by the same standards, even when the distillation is carefully carried out at a reflux ratio so high as to require sixty hours for the distillation of 7000 pounds.

In contrast thereto, the present process allows the handling of 7000 pounds of recovered monomer in the same equipment in about thirty hours and yields a distillate of A. P. H. A. color 2 or better.

The following example is given to illustrate a preferred specific embodiment of the distillation step according to the present invention.

*Example.*—The apparatus employed is a 35-plate fractionating column of conventional design equipped with means for introducing steam at the bottom of the column, crude monomer at an intermediate plate thereof, and means for condensing the vapors removed from the top of the column.

Crude recovered monomeric methyl methacrylate is introduced into the column at the twenty-first plate while live steam is introduced at the bottom of the column. The reflux ratio of the distillate returned to the column to the distillate removed is maintained between 1:1 and 1:3. The temperature of the vapors at the top of the column is about 82° C. and the temperature at the bottom of the column is approximately 100° C. The distillate removed from the top of the column is condensed in conventional manner and forms a two-layer liquid of monomer and water from which the monomer is separated.

The separation of the purified monomer from the water in the distillate may be thorough or incomplete depending upon the manner in which the monomer is to be used thereafter. If the purified monomer is subsequently to be polymerized in suspension in an aqueous medium, there is obviously no reason for separating it in a completely dry condition. If, however, it is to be used in a process of casting, i. e., polymerization in a mass for the production of massive resin, then the presence of water is ordinarily objectionable and the purified monomer will be substantially freed from the water with the aid of a dehydrating agent or by vacuum distillation.

It will be understood that the above example is merely illustrative of one preferred way of carrying out the distillation step of the present invention whereas the invention broadly comprises distilling the crude monomer under substantially atmospheric pressure with steam. It has been found that the reflux ratio employed is not critical and the ratio disclosed in the example is merely a convenient one. Also, there is no particular limitation on the type of distillation apparatus used in so far as this invention is concerned, although the ordinary multi-plate fractionating column seems to be most practical for this purpose.

The scrap polymer from which the monomer is derived by depolymerization is likely, in commercial practice, to contain various modifying agents such as polymers of other ethenoid monomers, plasticizers, lubricants, and the like. In general, it has been found that these are not responsible for the presence of the troublesome colored impurities persisting in the monomer derived by depolymerization. Other ethenoid resins than polymeric methyl methacrylate will, if present in the scrap resin, be in some cases subject to analogous depolymerization but the resulting monomers will ordinarily differ so much from the monomeric methyl methacrylate in boiling point as to be separated readily therefrom. The other non-resinous, auxiliary ingredients will for the most part not be carried into the crude recovered monomer and, in so far as they, or products of their decomposition, are present in the crude recovered monomer, they ordinarily will not tend to be distilled over with the monomeric methyl methacrylate, but rather to remain in the tailings.

An advantage of the present invention is that it makes feasible the recovery of monomeric methyl methacrylate of high purity and excellent color from polymeric methyl methacrylate scrap of commercial quality. A further advantage of the invention is that it provides an entirely practical procedure for effecting this recovery. The resins produced from monomer derived from polymer and purified in accordance with this invention are not inferior to those made from purified synthesized monomer in color or in stability of color toward sunlight.

As many apparently widely different embodiments of this invention may be made without departing from the spirit and scope thereof, it is to be understood that the invention is not limited to the specific embodiments thereof except as defined in the appended claims.

I claim:

1. Process of preparing monomeric methyl methacrylate of high purity and substantially free from color, from polymeric methyl methacrylate, which process comprises heating polymeric methyl methacrylate at a temperature above its decomposition point, condensing the vapors of monomeric methyl methacrylate resulting from said heating, distilling said condensed monomeric methyl methacrylate under substantially atmospheric pressure with steam, said steam being substantially the sole source of heat for said distillation, condensing the resulting mixture of vapors of monomeric methyl methacrylate and water, and separating the liquid monomeric methyl methacrylate from its resulting mixture with water.

2. Process of preparing monomeric methyl methacrylate of high purity and substantially free from color, from polymeric methyl methacrylate, which process comprises heating polymeric methyl methacrylate at a temperature above its decomposition point, condensing the vapors of monomeric methyl methacrylate resulting from said heating, distilling said condensed monomeric methyl methacrylate under substantially atmospheric pressure with steam, said steam being substantially the sole source of heat for said distillation, and condensing the resulting mixture of vapors of monomeric methyl methacrylate and water.

3. Process of preparing monomeric methyl methacrylate of high purity and substantially free from color, from polymeric methyl methacrylate, which process comprises heating polymeric methyl methacrylate at a temperature above its decomposition point, condensing the vapors of monomeric methyl methacrylate resulting from said heating, introducing said condensed monomeric methyl methacrylate simultaneously with live steam into a fractionating column, whereby said monomeric methyl methacrylate is vaporized, said live steam being substantially the sole source of heat for said vaporization, condensing the resulting mixture of vapors of monomeric methyl methacrylate and water, and separating the liquid monomeric methyl methacrylate from its resulting mixture with water.

4. Process of preparing monomeric methyl methacrylate of high purity and substantially free from color, from polymeric methyl methacrylate, which process comprises heating polymeric methyl methacrylate at a temperature above its decomposition point, condensing the vapors of monomeric methyl methacrylate resulting from said heating, introducing said monomeric methyl methacrylate into a multi-plate fractionating column at an intermediate plate thereof while simultaneously introducing steam at the bottom of said fractionating column whereby said monomeric methyl methacrylate is vaporized, said steam being substantially the sole source of said vaporization, maintaining a reflux ratio in said column between 1:1 and 1:3, condensing the mixture of vapors of monomeric methyl methacrylate and water drawn from said fractionating column, and separating the liquid monomeric methyl methacrylate from its resulting mixture with water.

BARNARD M. MARKS.